United States Patent
Angran et al.

(10) Patent No.: US 6,196,434 B1
(45) Date of Patent: Mar. 6, 2001

(54) FOOD AND BEVERAGE HOLDER FOR USE IN MOTOR VEHICLES

(76) Inventors: John J. Angran; Lori A. Angran, both of 144 Cedar Heights, Camanche, IA (US) 52730

( * ) Notice: Subject to any disclaimer, the term of this patent is extended or adjusted under 35 U.S.C. 154(b) by 0 days.

(21) Appl. No.: 09/250,118

(22) Filed: Feb. 16, 1999

(51) Int. Cl.[7] .................................................. B60R 7/04
(52) U.S. Cl. ......................... 224/549; 224/926; 224/553
(58) Field of Search ................... 224/926, 560, 224/561, 281, 282, 564, 565, 566, 549, 552, 553, 482; 108/46

(56) References Cited

U.S. PATENT DOCUMENTS 4,813,582  3/1989  Henricksen et al. .
5,294,026 * 3/1994 McGirt ................................ 224/560

* cited by examiner

*Primary Examiner*—Joseph M. Moy
(74) *Attorney, Agent, or Firm*—Simmons, Perrine, Albright & Ellwood PLC

(57) ABSTRACT

An apparatus for retaining various food items in a motor vehicle, including a cup holder having a stowable second cup holder therein in which the stowable second cup holder has a removable container therein, the cup holder having a supplemental support device for stabilizing the apparatus when it is extended. The apparatus further having a leveling device for maintaining a level orientation of the cup holder to accommodate various door widths.

18 Claims, 3 Drawing Sheets

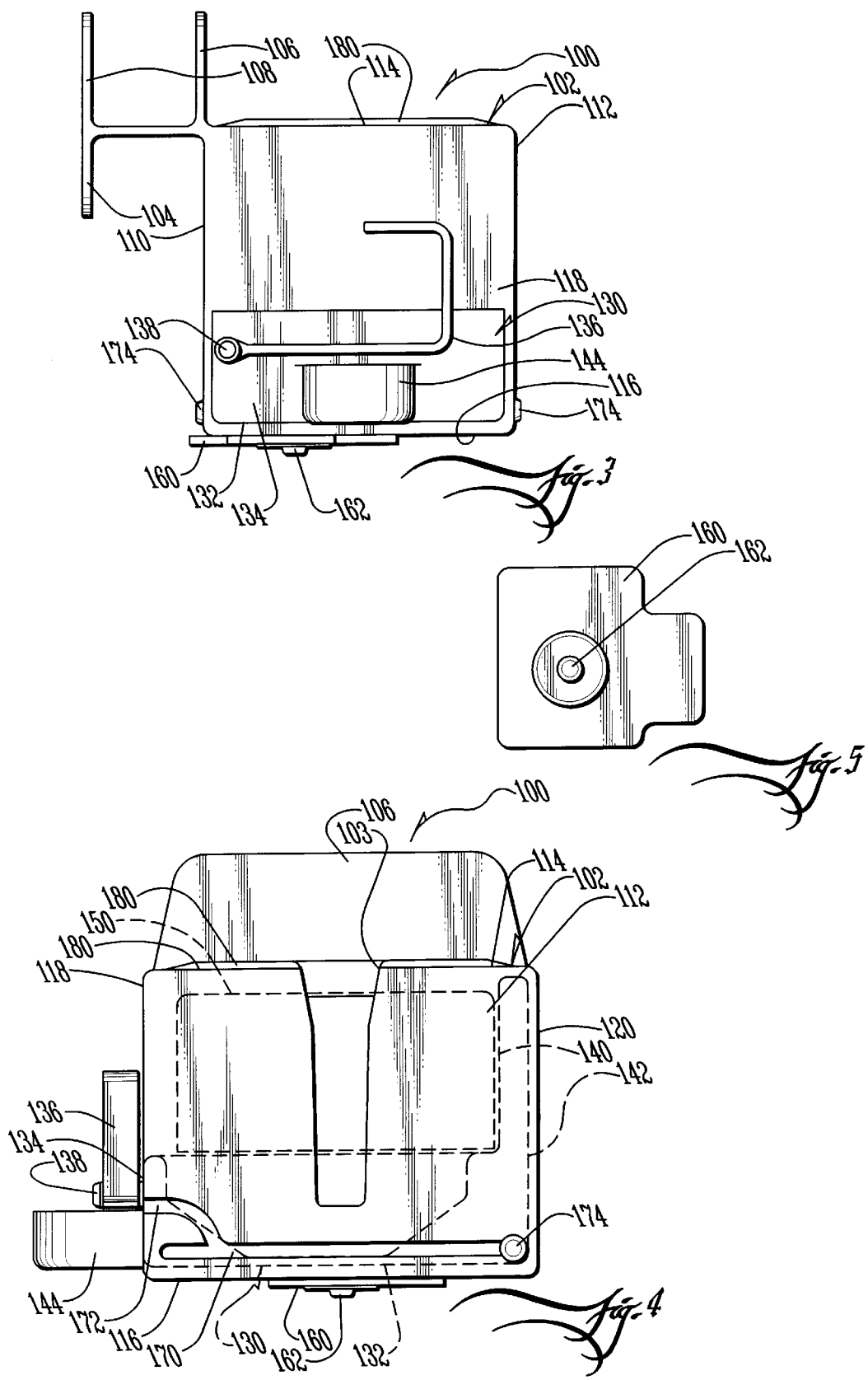

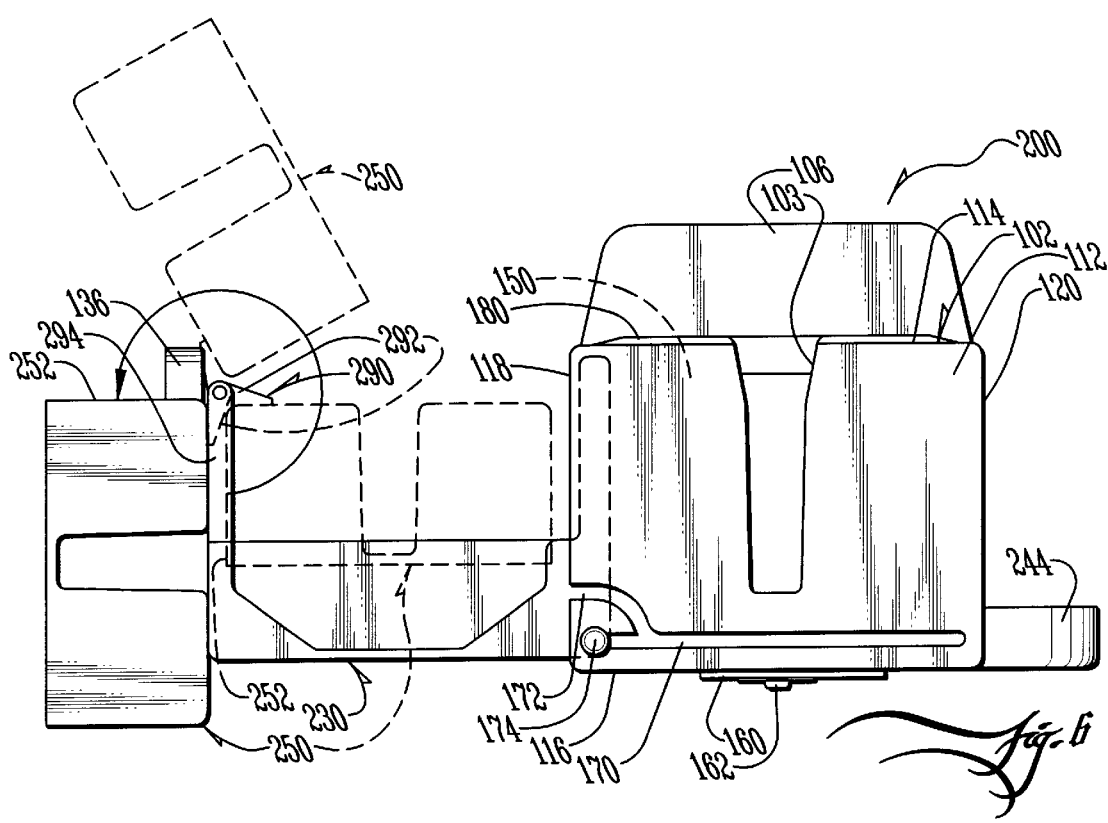

FOOD AND BEVERAGE HOLDER FOR USE IN MOTOR VEHICLES

FIELD OF THE INVENTION

The present invention generally relates to motor vehicle accessories and more particularly relates to devices for holding open beverage containers in motor vehicles.

BACKGROUND OF THE INVENTION

In the past, drivers and their passengers have frequently utilized the convenience of fast-food restaurants and their drive-up lanes, only to be immediately faced with the problem of where to put their food while they continue to drive. Typically, they need an arrangement in which the food is readily accessible to facilitate safe and easy consumption while the vehicle is being operated and at the same time, minimize food and beverage spills.

Door/window-mounted cup holders have enjoyed considerable success in recent years. However, they typically are unable to hold food items in addition to the beverage containers. U.S. Pat. No. 4,813,582 shows a food and beverage tray which is capable of holding both food and beverages, but with its dedicated space for food storage adjacent to the beverage container, it may be too bulky and awkward for many people and many vehicles.

Consequently, there exists a need for an improved device which is capable of retaining both beverage containers and food while the vehicle is in operation.

SUMMARY OF THE INVENTION

It is an object of the present invention to provide a food and beverage holder for motor vehicles which is compact.

It is a feature of the present invention to include a stowable pull-out drawer or tray for food or beverage items.

It is an advantage of the present invention to increase the capability of the device to retain food and beverage items while maintaining a compact overall size when stowed.

It is another object of the present invention to provide a design which is flexible to accommodate various food and beverage items.

It is another feature of the present invention to include an additional cup-holder receiving member stowed in the pull-out drawer which can be deployed to either retain an additional beverage container or food items such as a hamburger and French fries and even dipping sauce.

It is another advantage of the present invention to achieve a compact stable and versatile device which can accommodate various fast-food menu selections.

The present invention is an apparatus for retaining food and beverages for consumption in a motor vehicle which is designed to satisfy the aforementioned needs, produce the previously stated objects, include the above-listed features, and achieve the already articulated advantages.

Accordingly, the present invention is a container for receiving beverage containers having a pull-out tray or drawer for receiving and retaining additional beverage containers or food items and a means for coupling the device to an interior portion of a motor vehicle which is accessible to the driver and/or its occupants.

BRIEF DESCRIPTION OF THE DRAWINGS

The invention may be more fully understood by reading the following description of preferred embodiments of the invention, in conjunction with the appended drawings wherein:

FIG. 3 is a side view of the present invention, with the pull-out drawer and the French fry container in a stowed position. Dashed lines refer to concealed matter.

FIG. 4 is a front view of the present invention, with the pull-out drawer in a stowed position. Dashed lines refer to concealed matter.

FIG. 5 is a bottom view of the leveler of FIGS. 1, 3 and 4.

FIG. 6 is a view of an alternate embodiment of the present invention in which the drawer is opened and the French fry container is pivotally deployed and stowed. The dashed lines refer to intermediate and alternate positions of the French fry container during its pivotal deployment.

DETAILED DESCRIPTION

Figure 1:
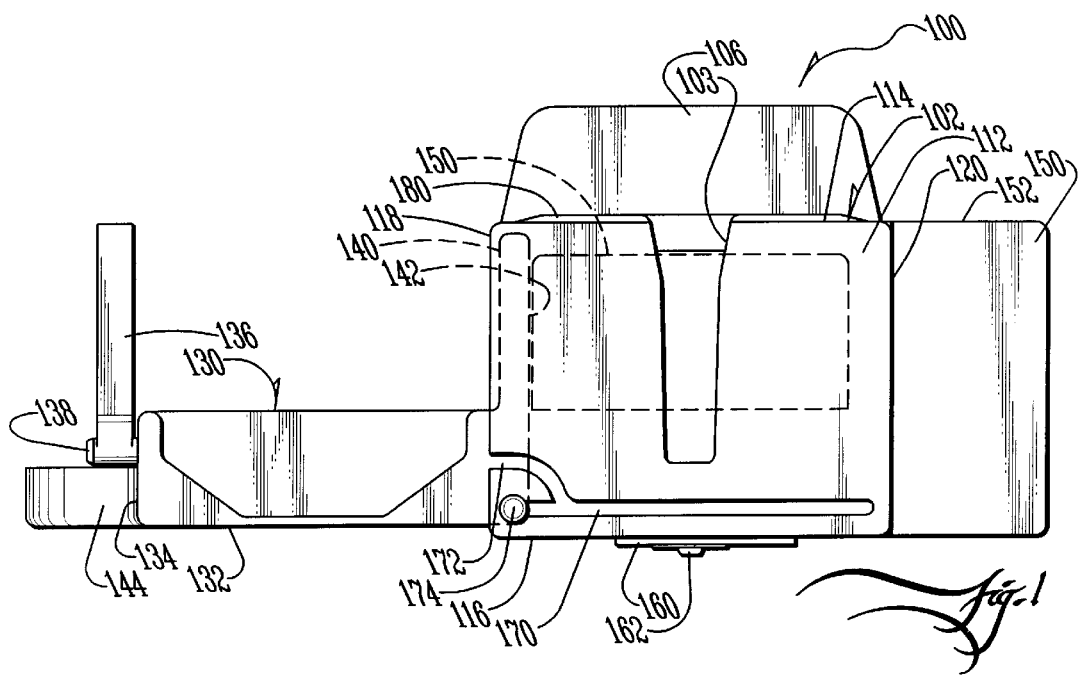
FIG. 1 is a front view of the device with the slide-out drawer in its open position and the French fry container in its fully deployed position. Dashed lines refer to concealed matter.

Now referring to the drawings, wherein like numerals refer to like matter throughout, and more particularly to FIG. 1, there is shown a front elevation view of the apparatus of the present invention, generally designated 100, having a main body 102 which is attached to a door attachment arm (not shown). Coupled to the door attachment arm is first napkin retaining member 106, which is disposed in front of a second napkin retaining member (not shown). Main body 102 has a handle receiving void 103 therein for receiving and allowing a cup handle to extend therethrough when a cup is inserted into main body 102. Body 102 has a body top 114 and a body bottom 116, as well as a drawer side 118 and an opposite side 120. Slidably disposed in body 102 is pull-out or slide-out drawer 130, which has a drawer bottom 132, a drawer faceplate 134, which has coupled to it a supplemental support arm 136 which is used for cooperating with a door of a vehicle (not shown). Supplemental support arm 136 is pivotally coupled to faceplate 134 through support arm pivot member 138. Drawer 130 has a drawer stabilizer riser 140 along the drawer back side 142. Coupled to faceplate 134 of drawer 130 is sauce container 144. French fry container 150 is shown disposed along opposite side 120 of main body 102. French fry container 150 is shown having a fry container top 152. Disposed in front body side 112 is slide track 170 and slide removal track 172 which are for receiving slide guide member 174 which is coupled to drawer 130. A leveler 160 is shown disposed on bottom side 116 of main body 102.

In a preferred embodiment, main body 102 is constructed of a lightweight, durable and at least semi-rigid material such as plastic, paper, metal, cardboard or any other suitable material. Drawer 130, French fry container 150, sauce container 144, napkin retaining member 106, supplemental support arm 136 and leveler 160 may all be made of materials similar to main body 102.

Figure 2:
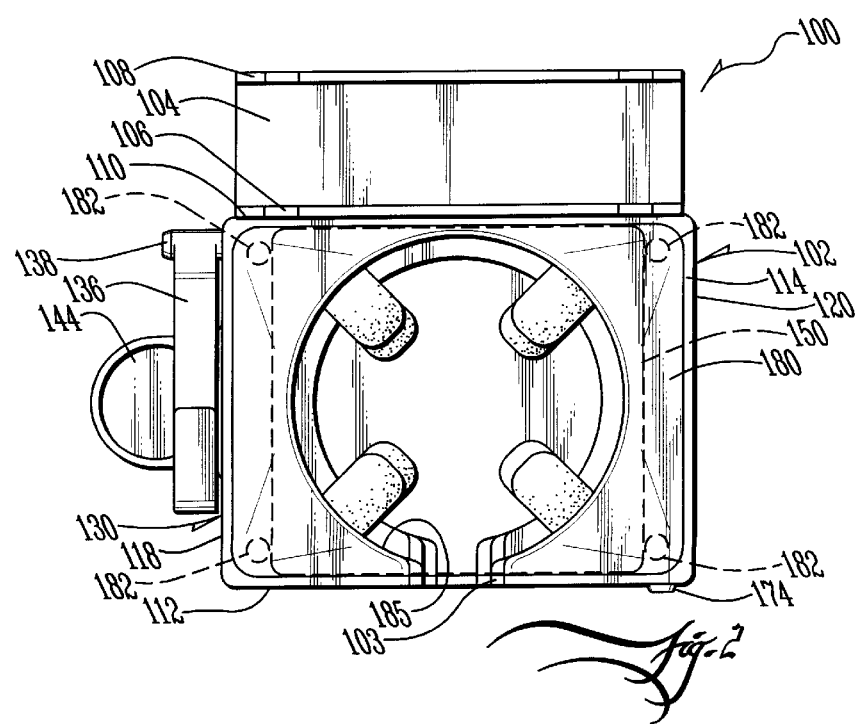
FIG. 2 is a top view of the present invention, with the pull-out drawer and French fry container in stowed positions.

Now referring to FIG. 2, there is shown a top view of the apparatus 100 of the present invention, a door attachment arm 104 is shown coupled to main body 102, a removable top member 180 is disposed inside main body 102 and affixed to main body 102 by fasteners 182. In a preferred embodiment, several removable tops 180 may be included, each having a different sized orifice therein for receiving a beverage container. In alternate embodiments, the door attachment arm 104 may be any vehicle connector which could be adhesives, Velcro, or other apparatus for connection to the vehicle, including hardware for permanent mounting or incorporation of the apparatus into components of the vehicle.

Now referring to FIG. 3, there is shown a side view of the apparatus 100 of the present invention which shows a back side 110 of main body 102 and a leveler pivoting pin 162. Opposite back side 110 is front side 112.

Now referring to FIG. 4, there is shown a front view of the apparatus 100 of the present invention with the drawer 130 stowed inside main body 102. The slide guide member 174 is shown disposed near opposite side 120.

Now referring to FIG. 5, there is shown a bottom view of the leveler 160 of FIGS. 1, 3 and 4, which shows a pivoting point having leveler pivot member 162 disposed therein.

Now referring to FIGS. 1 through 5, the operation of the apparatus 100 of the present invention is hereafter described. The apparatus 100 is attached to a door of a motor vehicle by inserting door attachment arm 104 into a gap between the door panel and a window typically disposed in the door. The main body 102 then hangs from the door attachment arm 104 along the inside of a door panel. The main body is maintained in a relatively level orientation by leveler 160 which contacts the door panel and keeps the back side 110 of the main body 102 from rotating toward the door panel. Leveler 160 pivots around leveler pivot member 162 in a manner so that the amount of leveler 160 which extends beyond the back side 110 can be selected to accommodate for varying door panel thicknesses. A cup (not shown) can be inserted through orifice 185 in removable top 180. A handle extending from the cup can extend through the void 103 in the front side 112 of main body 102. The cup then can be retained within the apparatus 100. However, if the user desires additional space, a slide-out drawer 130 can be pulled from the main body 102, thereby creating a space for placing additional food items. If these additional food items are heavy, the supplemental support arm 136 can be pivoted upward around supplemental support pivot member 138, so that it is engaged with the vehicle door panel. If it becomes necessary to clean the apparatus 100, drawer 130 can be slid along slidetrack 170 until it reaches slide removal track 172 and then slid along that track and out of the main body 102. If more containing space is desired and the cup is not disposed within the orifice 185, then the drawer 130 can be slid along track 170 and French fry container 150 can be removed from the main body 102, along with the drawer 130. French fry container 150 then can be removed from drawer 130 and attached to the opposite side 120 of main body 102 through various means, including hooks, Velcro, snaps or any other suitable attachment means. If a different size orifice is desired, then removable top 180 can be removed from main body 102, and an alternate removable top with a different sized orifice can be put in its place. Napkin retaining members 106 and 108 can be used to support napkins or any other article, such as tacos, etc. Similarly, French fry container 150 can be used to contain any item.

Now referring to FIG. 6, there is shown an alternate embodiment of the present invention in which the French fry container 150 of FIGS. 1, 3 and 4 is replaced with French fry container 250, which is detachably and pivotally coupled with pull-out drawer 230 (which replaces pull-out drawer 130 of FIGS. 1, 3 and 4). French fry container 250 is coupled to drawer 230 with a rotating member 290 being coupled to the drawer and also attached to a pivoting arm 292, which is coupled to French fry container 250 through detachable member 294. The dashed lines represent intermediate and alternate positions of French fry holder 250. A first edge 252 of French fry holder 250 is labeled in each intermediate and alternate position to assist in visualizing the pivoting process. The sauce container 144 of FIGS. 1, 3 and 4 is replaced with sauce container 244, which is disposed on opposite side 120 of body 102. The design and operation of apparatus 200 is similar to the design and operation of apparatus 100 in many respects, including the removal of the drawer 230 by causing the slide guide member 174 to proceed along slide removal track 172.

It is thought that the method and apparatus of the present invention will be understood from the foregoing description, and it will be apparent that various changes may be made in the form, construction, steps and arrangement of the parts and steps thereof without departing from the spirit and scope of the invention or sacrificing all other material advantages, the form herein described being merely a preferred or exemplary embodiment thereof.

We claim:

1. A meal container for use in and in attachment with a motor vehicle, the container comprising:
   a first container for receiving a first beverage container therein;
   a vehicle connector for stabilizing said first container;
   a stowable tray slidably coupled to said first container for receiving a first food item therein;
   said stowable tray having a second container therein which is movable with respect to said first container and said stowable tray, said second container for containing second food items therein when said second container is deployed outwardly from said stowable tray.

2. A meal container of claim 1 wherein said second container is detachably coupled with said stowable tray.

3. A meal container of claim 2 wherein said second container is detachably couplable with said first container.

4. A meal container of claim 1 wherein said second container is pivotally attached with said stowable tray.

5. A meal container of claim 1 wherein said vehicle connector is a door attachment arm coupled to said first container.

6. A meal container of claim 1 wherein said vehicle connector is an adhesive.

7. A meal container of claim 1 wherein said stowable tray is slidably coupled with said first container.

8. A meal container of claim 5 wherein said second container is detachably couplable with said first container.

9. A meal container for use in and in attachment with a motor vehicle, the container comprising:
   a first container for receiving a first beverage container therein;
   a vehicle connector for stabilizing said first container;
   a stowable tray coupled to said first container for receiving a first food item therein;
   said stowable tray having a second container therein which is movable with respect to said first container and said stowable tray, said second container for containing second food items therein when said second container is deployed outwardly from said stowable tray;
   wherein said vehicle connector is a door attachment arm coupled to said first container;
   wherein said second container is detachably couplable with said first container; and a supplemental vehicle support connector for stabilizing said first container and said stowable tray when said stowable tray is disposed outwardly from said first container.

10. A meal container of claim 9 wherein said vehicle connector has disposed thereon a third container for receiving a third food item.

11. A meal container of claim 10 wherein said third container has an open top side, an open drawer side, and an open opposite side.

12. A meal container of claim 11 further comprising a leveler device coupled to said first container, said leveler device having an adjustable characteristic which is configurable to multiple configurations in a repeatable fashion.

13. A meal container of claim 12 wherein said first container has a removable top panel, having an orifice therein of a predetermined size for receiving beverage containers having predetermined dimensions.

14. A meal container of claim 13 wherein said stowable tray has a fourth container coupled thereto.

15. A food receptacle for use in a vehicle comprising:

means for receiving a first item;

stowable means for receiving a second item coupled to said means for receiving a first item;

a movable means for receiving a third item, said movable means disposable in said stowable means;

wherein said stowable means is a slidable drawer coupled to said means for receiving a first item; and a means for stabilizing said means for receiving a first item.

16. A food receptacle of claim 15 wherein said movable means is a container for nesting inside of said drawer and further having a connecting means for detachably coupling with said means for receiving a first item.

17. A food receptacle of claim 16 wherein said means for stabilizing includes a means for leveling said means for receiving a first item.

18. A cup holder for use in a vehicle comprising:

a first receptacle for receiving a beverage container;

a door connecting arm extending outwardly from said first receptacle for stabilizing first receptacle;

said door connecting arm having a pair of parallel planar members disposed thereon for retaining objects therebetween;

a sliding drawer extendable from a stowed position interior of said first receptacle;

a second receptacle disposed in said drawer for containing articles therein when said second receptacle is deployed outwardly from said sliding drawer;

said second receptacle further having an orifice therein for receiving a second beverage container when said second receptacle is deployed in said sliding drawer;

a supplemental support arm coupled to said sliding drawer for further stabilizing said first receptacle when said sliding drawer is in an extended position from said first receptacle; and a spacer coupled to said first receptacle having a plurality of spacer extension lengths which are selectable in a repeatable fashion.

* * * * *